(12) United States Patent
Kuretich

(10) Patent No.: US 9,612,442 B2
(45) Date of Patent: Apr. 4, 2017

(54) KEYBOARD MAGNIFYING DEVICE

(71) Applicant: Stephen Kuretich, Grand Junction, CO (US)

(72) Inventor: Stephen Kuretich, Grand Junction, CO (US)

(*) Notice: Subject to any disclaimer, the term of this patent is extended or adjusted under 35 U.S.C. 154(b) by 0 days.

(21) Appl. No.: 14/844,822

(22) Filed: Sep. 3, 2015

(65) Prior Publication Data

US 2016/0327800 A1 Nov. 10, 2016

Related U.S. Application Data

(60) Provisional application No. 62/158,931, filed on May 8, 2015.

(51) Int. Cl.
*G02B 27/02* (2006.01)
*G02B 25/02* (2006.01)

(52) U.S. Cl.
CPC .......... *G02B 27/027* (2013.01); *G02B 25/02* (2013.01); *G02B 27/028* (2013.01)

(58) Field of Classification Search
CPC ................................................... G02B 27/027
USPC ........................................................ 359/802
See application file for complete search history.

(56) References Cited

U.S. PATENT DOCUMENTS

| | | | |
|---|---|---|---|
| 4,012,127 A | 3/1977 | Bolander | |
| 4,958,907 A * | 9/1990 | Davis | G02B 25/002 248/298.1 |
| 5,493,451 A * | 2/1996 | Cosey, Sr. | G02B 25/005 359/809 |
| 5,847,883 A | 12/1998 | Rispoli, Sr. | |
| 5,999,340 A * | 12/1999 | Goff | G02B 25/02 359/804 |
| 6,088,173 A | 7/2000 | Mendelsohn et al. | |
| 7,548,386 B2 | 6/2009 | Huang | |
| 7,782,554 B1 * | 8/2010 | Griffin | G02B 25/005 359/802 |
| 8,294,998 B1 | 10/2012 | Samo | |
| 2002/0051304 A1 * | 5/2002 | Jung | G02B 25/002 359/802 |
| 2004/0041067 A1 | 3/2004 | Jung | |
| 2005/0141185 A1 * | 6/2005 | O'Neal | H04M 1/027 361/679.01 |
| 2007/0035853 A1 * | 2/2007 | Bendror | G02B 25/005 359/802 |
| 2011/0069404 A1 | 3/2011 | Lappin | |
| 2011/0291958 A1 | 12/2011 | Wu et al. | |

* cited by examiner

*Primary Examiner* — James Jones

(74) *Attorney, Agent, or Firm* — Global Intellectual Property Agency, LLC; Daniel Boudwin

(57) ABSTRACT

A keyboard magnifying device for allowing users to more easily view the keys on a keyboard. The keyboard magnifying device includes a base on which a keyboard can be positioned, an upstanding post extending upwardly from a rear portion of the base, and a frame pivotally attached to the upper end of the upstanding post. The frame includes an open central area, wherein a magnifying lens is positioned over the open central area. The frame and magnifying lens are vertically aligned with the base so that a user can look through the magnifying lens at the keyboard disposed on the base in order to provide an enlarged view of the keys thereon. The keyboard magnifying device may further include one or more lights directed at the base so as to illuminate the keyboard positioned thereon.

5 Claims, 3 Drawing Sheets

KEYBOARD MAGNIFYING DEVICE

CROSS REFERENCE TO RELATED APPLICATION

This application claims the benefit of U.S. Provisional Application No. 62/128,931 filed on May 8, 2015. The above identified patent application is herein incorporated by reference in its entirety to provide continuity of disclosure.

BACKGROUND OF THE INVENTION

Field of the Invention

The present invention relates to magnifying devices. More specifically, the present invention provides a keyboard magnifying device for allowing users to more easily view the keys on a computer keyboard. The magnifying device comprises a base on which a keyboard can be positioned, an elongated post extending upwardly therefrom, and a frame that supports a magnifying lens thereon wherein the magnifying lens is vertically aligned with the base and the keyboard thereon.

Typing efficiently is an important skill for many workers in various fields. Many people have jobs that require them to spend some or most of their time working on a computer. However, many people are not proficient with computers and may have difficulty typing on a computer keyboard. While learning to type, the person may have to spend considerable time looking at the keyboard in order to identify the proper keys. Further, the keys on the keyboard are small and many people may have difficulty viewing the keys, making it more difficult to type. As a result, a magnifying device for helping a user to more easily view the keys on a keyboard is desired.

Devices have been disclosed in the prior art that relate to keyboard magnifying devices. These include devices that have been patented and published in patent application publications. These devices generally relate to magnifying devices attachable to lamps, computers, handheld devices, and other objects, such as U.S. Pat. No. 8,294,998, U.S. Pat. No. 6,088,173, U.S. Pat. No. 5,847,883, U.S. Pat. No. 7,548,386, U.S. Published Patent Application Number 2004/0041067, U.S. Published Patent Application Number 2011/0291958, U.S. Pat. No. 4,012,127, and U.S. Published Patent Application Number 2011/0069404.

These prior art devices have several known drawbacks. The devices in the prior art provide magnifying devices specifically adapted for use with a computer keyboard. However, such devices fail to provide a magnifying device having a base on which a keyboard can be positioned, and that further includes lights directed towards the keyboard in order to allow a user to more easily view the keys thereon.

In light of the devices disclosed in the prior art, it is submitted that the present invention substantially diverges in design elements from the prior art and consequently it is clear that there is a need in the art for an improvement to existing keyboard magnifying devices. In this regard the instant invention substantially fulfills these needs.

SUMMARY OF THE INVENTION

In view of the foregoing disadvantages inherent in the known types of keyboard magnifying devices now present in the prior art, the present invention provides a new keyboard magnifying device wherein the same can be utilized for providing convenience for the user when helping a user to more easily view the keys on a keyboard.

It is therefore an object of the present invention to provide a new and improved keyboard magnifying device comprising a base on which a keyboard can be positioned, an upstanding post extending therefrom, and a frame attached to the upper end of the post, wherein a magnifying lens is disposed on the frame.

It is another object of the present invention to provide a keyboard magnifying device wherein the upstanding post is telescopic for allowing a user to adjust the height of the magnifying device.

Another object of the present invention is to provide a keyboard magnifying device wherein the frame on which the magnifying lens is mounted is pivotally attached to the upstanding post.

Yet another object of the present invention is to provide a keyboard magnifying device that includes one or more lights directed towards said base for illuminating a keyboard positioned thereon.

Another object of the present invention is to provide a keyboard magnifying device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
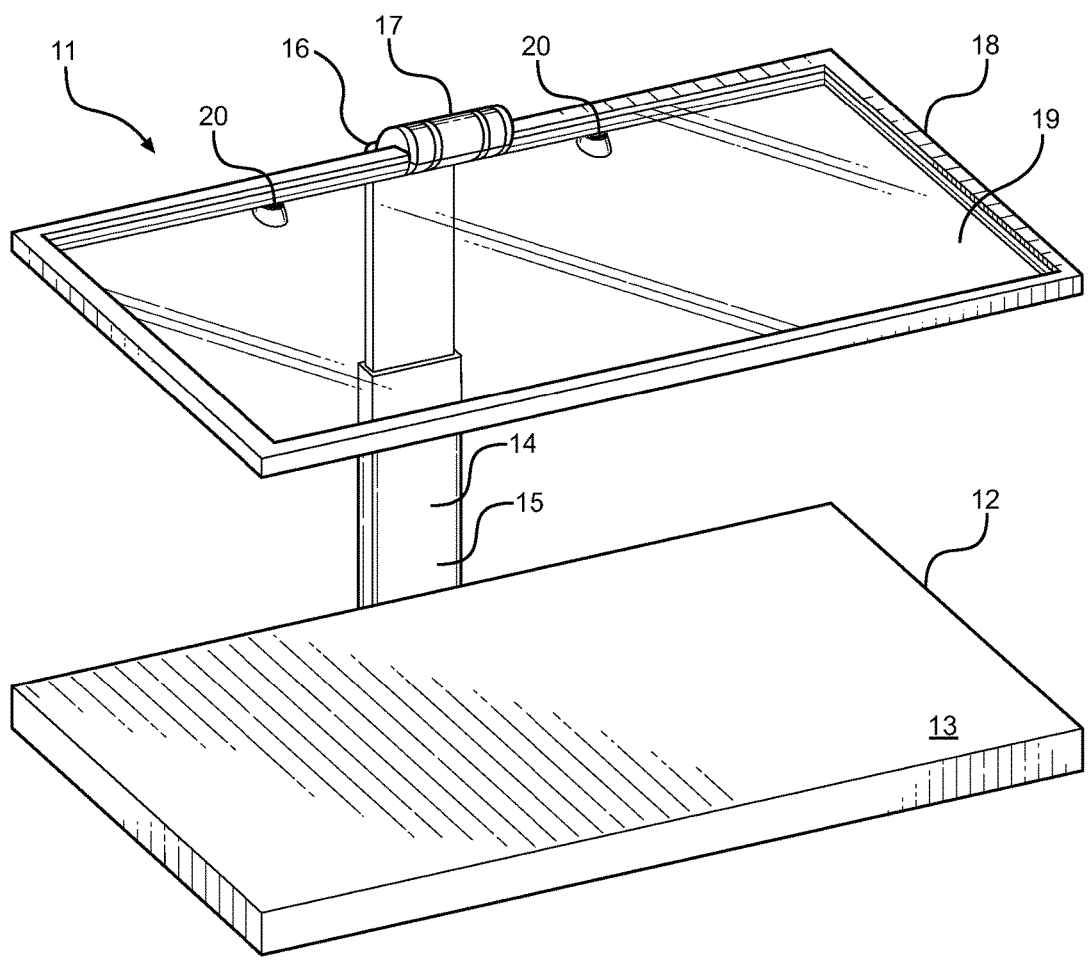
FIG. 1 shows a front perspective view of the keyboard magnifying device.

Reference is made herein to the attached drawings. Like reference numerals are used throughout the drawings to depict like or similar elements of the keyboard magnifying device. For the purposes of presenting a brief and clear description of the present invention, the preferred embodiment will be discussed as used for magnifying the keys on a keyboard in order to allow the user to more easily see the keys as he or she is typing. The figures are intended for representative purposes only and should not be considered to be limiting in any respect.

Referring now to FIG. 1, there is shown a front perspective view of the keyboard magnifying device. The keyboard magnifying device 11 comprises a base 12 on which a keyboard is adapted to be positioned. The base 12 preferably comprises a rectangular configuration so that it is shaped similarly to a keyboard. The base 12 further includes a planar upper surface 13 so that the keyboard can rest thereon. In some embodiments, the base 12 includes a tilted or angled upper surface 13 so that the keyboard is angled towards the user in order to facilitate typing. The base 12 can be placed on any support surface, such as a table or a counter.

At least one upstanding post 14 extends upwardly from the base 12. Preferably, the post 14 is affixed to a rear portion of the base 12 so that the post 14 does not interfere with the positioning of a keyboard on the base 12. The post 14 preferably extends vertically upward from the base 12 such that it is perpendicular thereto. In the illustrated embodiment, the upper end 16 of the post 14 is curved inward towards the base 12.

A frame 18 is pivotally attached to the upper end of the post 14 via a hinge 17. The frame 18 is preferably rectangular in configuration and defines an open central area. A magnifying lens 19 extends across the frame 18 over the open central area. The frame 18 is similar in size to the base 12 so that the magnifying lens 19 extends over the entire keyboard positioned on the base 12. This allows the magnifying lens 19 to be used to magnify the entire keyboard without requiring the user to reposition the magnifying lens 19. The frame 18 is vertically aligned with the base 12 so that it is positioned directly thereover. The frame 18 is adapted to pivot about the hinge 17 as desired by the user so that the user can more easily view the keyboard.

Figure 3:
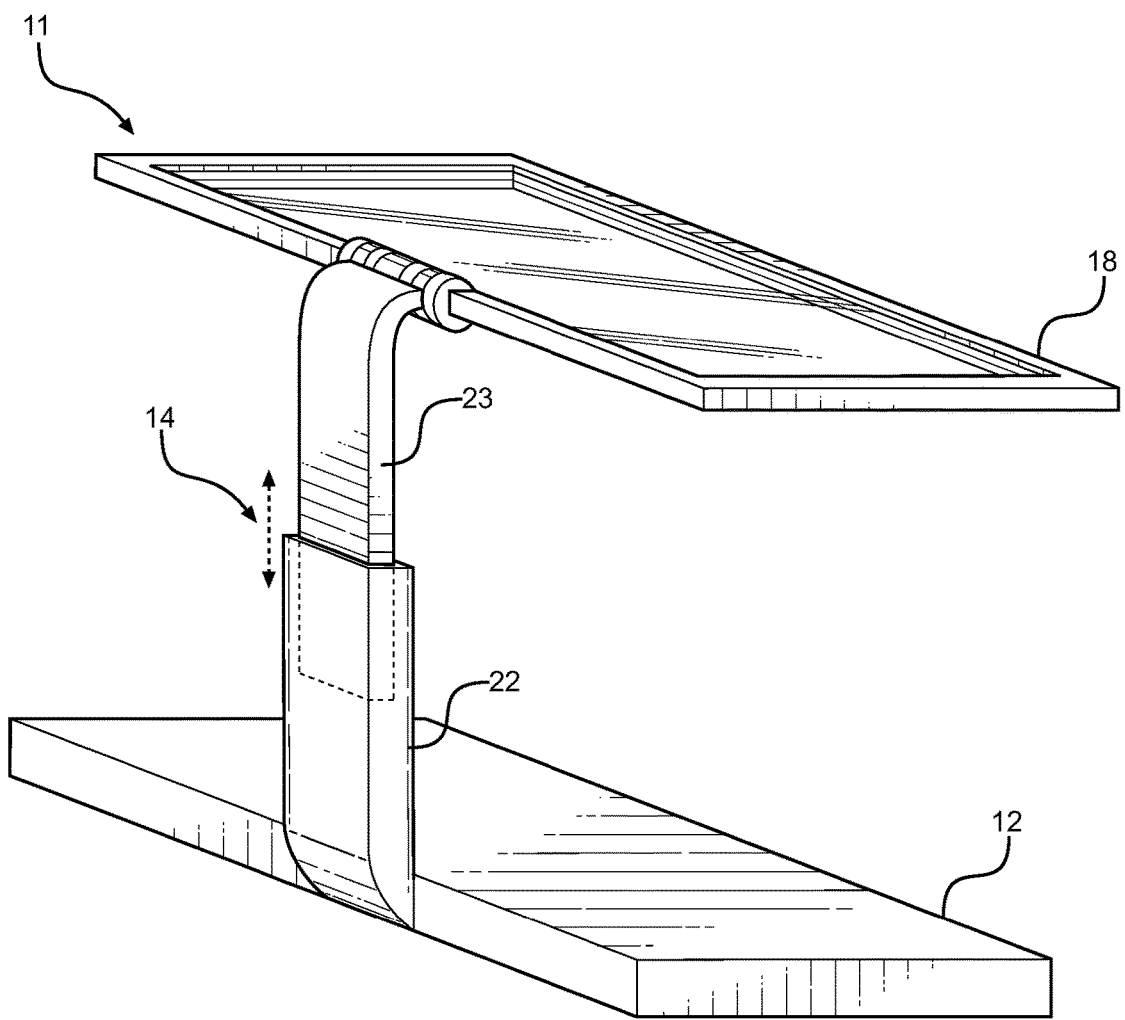
FIG. 3 shows a side perspective view of the keyboard magnifying device.

Referring now to FIG. 3, there is shown a side perspective view of the keyboard magnifying device. In some embodiments, the upstanding post 14 is telescopic so that the length of the upstanding post 14 can be adjusted. The upstanding post 14 comprises a first section 22 and a second section 23, wherein the second section 23 is slidably positioned within the interior of the first section 22. The second section 23 can be extended outward from the first section 22 in order to extend the length of the upstanding post 14, or the second section 23 can be inserted within the first section 22 to shorten the upstanding post 14. The post 14 is secured at a desired length via a frictional fit between the first section 22 and second section 23 or by means of a locking mechanism.

Figure 2:
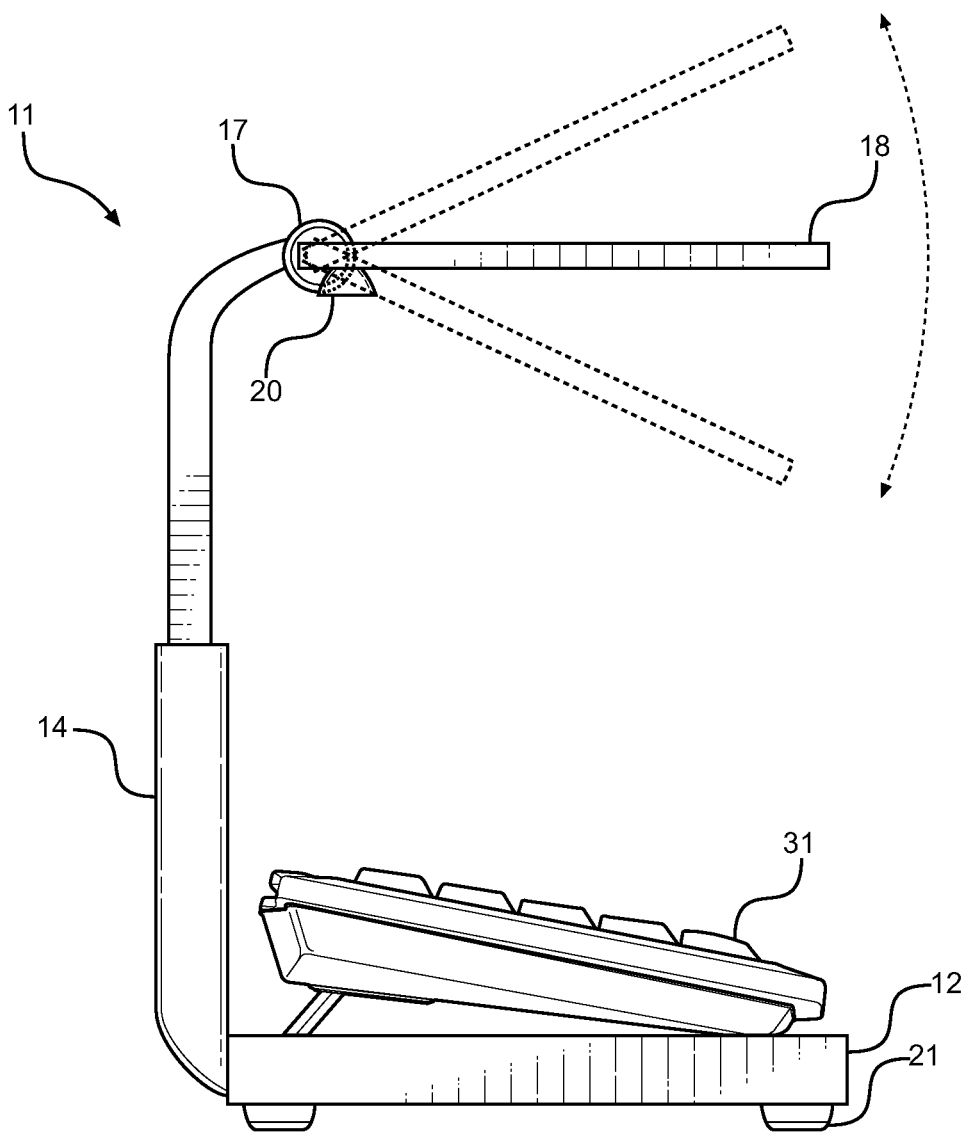
FIG. 2 shows a side view of the keyboard magnifying device.

Referring now to FIG. 2, there is shown a side view of the keyboard magnifying device. In operation, the user can position the keyboard magnifying device 11 in a desired position on a support surface, such as a table or desk. The lower surface of the base 12 includes one or more pads 21 thereon. The pads 21 are preferably composed of a high-friction material, such as rubber, in order to prevent the base 12 from sliding on a support surface.

A keyboard 31 can be positioned directly on the upper surface of the base 12. The frame 18 having the magnifying lens thereon is disposed directly above the base 12 so that the user can look downward at the keyboard 31 through the lens, wherein the keys on the keyboard 31 will appear larger. The user can tilt the frame 18 so as to adjust the positioning of the frame 18 and magnifying lens, depending upon the user's desired viewing angle. Further, the user can adjust the height of the post 14 in order to move the frame 18 and magnifying lens 19 closer or farther away from the keyboard 31.

In some embodiments, one or more lights 20 are positioned on the keyboard magnifying device 11. Preferably, the lights 20 are arranged on the frame 18 and are directed towards the base so as to illuminate the keyboard thereon. The lights 20 are preferably one or more LED lights so as to provide high brightness with limited power consumption. The lights 20 can be electrically connected to a power source housed within the base 12, or can be electrically connected to an external power source, depending upon the embodiment.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A keyboard magnifying device, comprising:
   a rectangular base including a planar upper surface and a longitudinal side;
   an upstanding post including a lower end, an upper end, a first section, and a second section, the lower end being affixed to a center of the longitudinal side of the base and the upper end curving inwardly towards the base;
   wherein the upstanding post extends vertically upwards and perpendicularly relative to the base;
   wherein the second section is slidably positioned within an interior of the first section, such that said second section can be extended vertically upwards from the first section or retracted vertically downwards into the first section;
   a hinge disposed on the upper end of the upstanding post;
   a frame pivotally connected to the hinge, the frame including an open central area;
   a magnifying lens positioned on the frame over the open central area; and
   one or more pads disposed on a lower surface of the base, the one or more pads constructed of a high-friction material.

2. The keyboard magnifying device of claim 1, further comprising one or more lights disposed on said frame.

3. The keyboard magnifying device of claim 1, wherein said frame is rectangular in shape, the frame including a longitudinal side, wherein a center thereof is pivotally connected to the hinge.

4. The keyboard magnifying device of claim 1, wherein the upstanding post further comprises a friction fit locking mechanism configured to secure the second section in a desired position within the interior of the first section when extended or retracted therein.

5. The keyboard magnifying device of claim 3, wherein the frame is coextensive and aligned with the base.

* * * * *